United States Patent [19]

van Bilderbeek

[11] Patent Number: 5,026,200
[45] Date of Patent: Jun. 25, 1991

[54] RELEASABLE CONNECTOR

[75] Inventor: Bernard H. van Bilderbeek, Aberdeen, United Kingdom

[73] Assignee: Plexus Pipe Products Limited, Aberdeen, Scotland

[21] Appl. No.: 546,020

[22] Filed: Jun. 28, 1990

[30] Foreign Application Priority Data

Jun. 29, 1989 [GB] United Kingdom ................ 8914931

[51] Int. Cl.⁵ .............................................. B25G 3/18
[52] U.S. Cl. .................................. 403/322; 403/328; 403/326; 285/321
[58] Field of Search ................. 403/326, 321, 322, 15, 403/328; 285/321

[56] References Cited

U.S. PATENT DOCUMENTS

| 3,297,344 | 1/1967 | Hanes | 285/321 X |
| 3,345,085 | 10/1967 | Hanes | 285/321 X |
| 3,455,578 | 7/1969 | Hanes | 285/321 X |
| 4,138,148 | 2/1979 | Zaremba | 403/15 X |
| 4,603,886 | 8/1986 | Pallini, Jr. et al. | |
| 4,830,408 | 5/1989 | Reimert | |

Primary Examiner—Andrew V. Kundrat
Attorney, Agent, or Firm—Ratner & Prestia

[57] ABSTRACT

A releasable connector (3) is described for connecting a first member (2) to a second member (1), the members (1, 2) being adapted to be inserted into one another. The releasable connector (3) comprises a lock element (4) located in a recess (5) in a surface of the first member (2) and biasing means is provided to bias the lock element (4) to a first position in which the lock element (4) extends from the recess (5) to engage a shoulder on the second member (1) to lock the first member (2) to the second member (1) against withdrawal. A movable release device (7) is located on the second member (1) so that actuation of the release device (7) causes the release device (7) to co-operate with a surface (9) of the lock element (4) to move the lock element (4) to a second position against the action of the biasing means. This causes the lock element (4) to be disengaged from the shoulder on the second member (1) with the release device (4) terminating short of the recess (5) in the first member (2). The arrangement is such that during withdrawal of the members (1, 2) from each other the lock element (4) moves to a third position in which the lock element (4) is further into the recess (5) than in the second position.

9 Claims, 2 Drawing Sheets

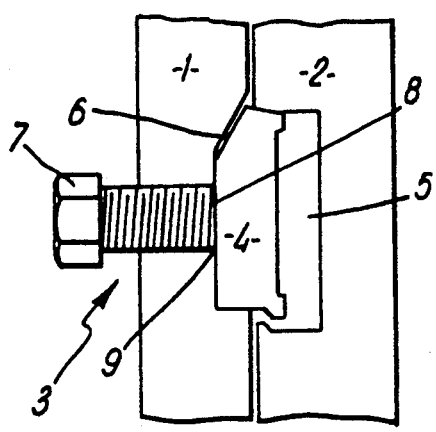
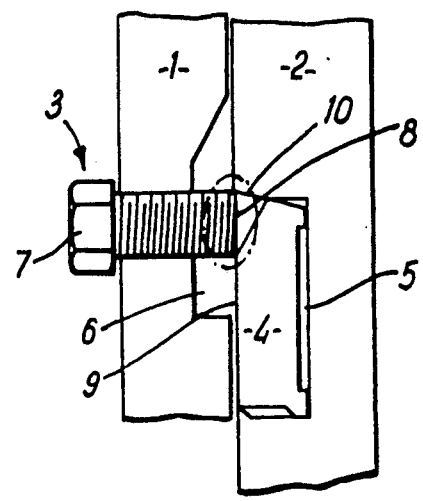
FIG. 1A
PRIOR ART
FIG. 1B
PRIOR ART
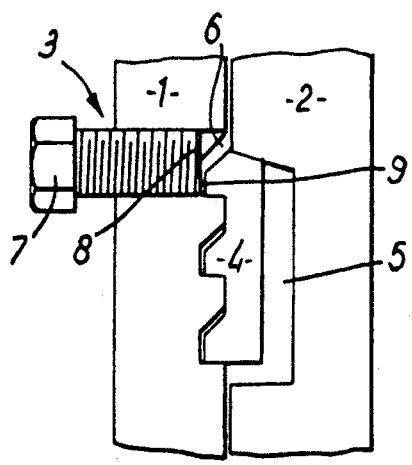
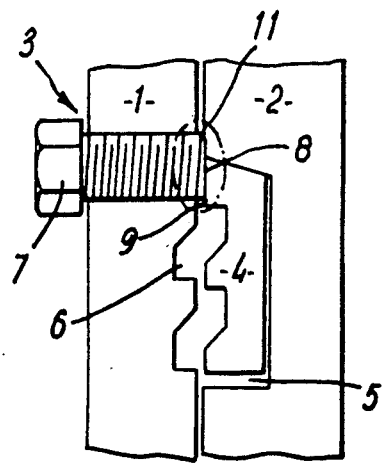
FIG. 2A
PRIOR ART
FIG. 2B
PRIOR ART
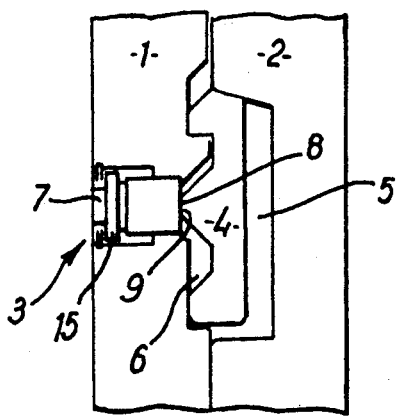
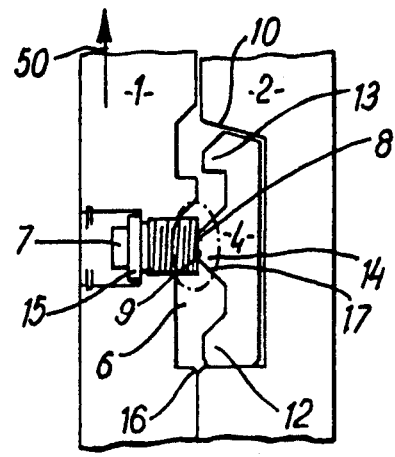
FIG. 3A
FIG. 3B

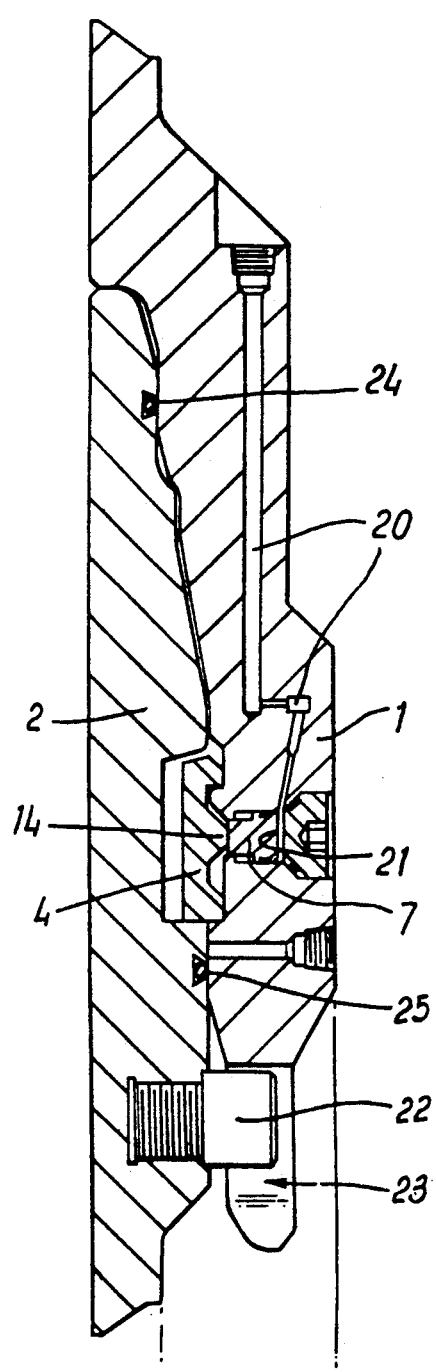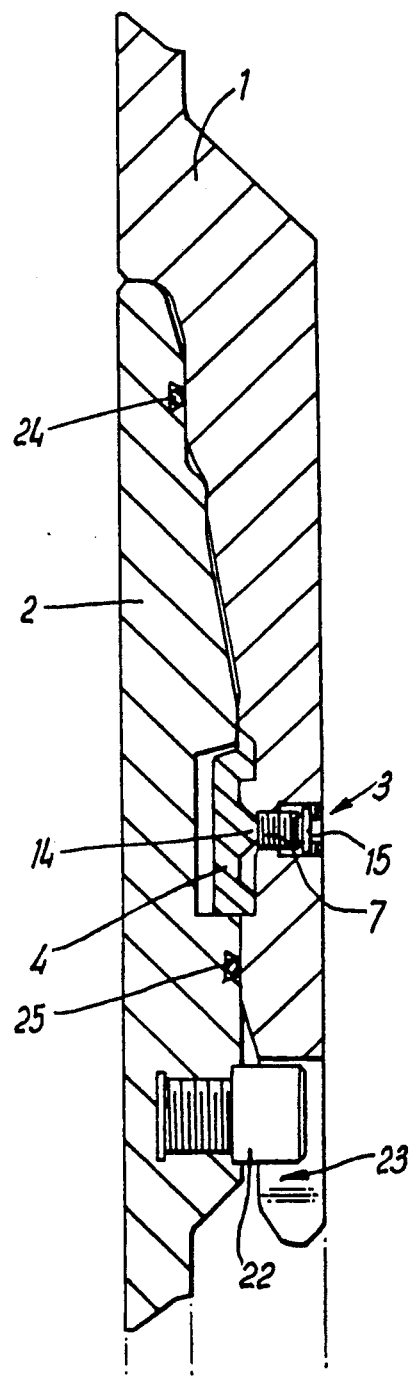
FIG.4 FIG.5

RELEASABLE CONNECTOR

The invention relates to releasable connectors and, in particular, connectors for releasably connecting sections of pipe.

BACKGROUND OF THE INVENTION

Stab type connectors are extensively used in offshore drilling applications. This type of connector is used to connect sections of pipe together as they are lowered into a pre-drilled hole. The connectors are also used where pipe is driven into the ground. Extensive use is made of stab type connectors in offshore drilling, however other applications include onshore drilling operations, pipeline technology and all other applications where quick connections of sections of pipe are required.

One of the features of stab type connectors is their ability to release should the user require to dismantle long pipe sections. In particular, the ability to rapidly achieve disconnection of long pipe sections on site on the oilfield can save a considerable amount of time, thus resulting in lower cost operations.

Many of the conventional stab type connectors comprise a lock ring housed on the pin section of a pipe which expands into a groove on the box end of a second pipe to which the first pipe is to be connected in order to lock the two pipes together. To release the connector this lock ring is depressed with a set of radial bolts located in the box section of the second pipe. These conventional stab type connectors present the risk of jamming the connector while trying to release it. This may be for example by the release bolts gripping the pin section of the first pipe or by the release bolts becoming trapped in the groove which locates the locking ring on the first pipe.

SUMMARY OF THE INVENTION

In accordance with the present invention, a releasable connector for connecting a first member to a second member, the members being adapted to be inserted one within the other, comprises a lock element located in a recess in a surface of the first member; biasing means to bias the lock element to a first position in which the lock element extends from the recess to engage a shoulder on the second member to lock the first member to the second member against withdrawal; and a movable release device located on the second member whereby actuation of the release device causes the release device to co-operate with a surface of the lock element to move the lock element to a second position, against the action of the biasing means, in which the lock element is disengaged from the shoulder on the second member with the release device terminating short of the recess in the first member, the arrangement being such that during withdrawal of the members one from the other the lock element moves to a third position in which the lock element is further into the recess than in the second position.

By providing a releasable connector which comprises a release device which terminates short of the recess in the first member after the release device has been actuated mitigates the problems associated with conventional connectors.

In one example the release device comprises a bolt and is actuated by screwing the bolt through the second member so that an end of the bolt co-operates with the surface of the lock element. In a second example the release device may comprise a fluid actuated piston within the second member which upon actuation by the fluid is forced to co-operate with the surface of the lock element.

Preferably, the release device comprises a stop element which prevents the release device from entering the recess in the first member.

In the preferred embodiment, the lock element comprises a number of projections which co-operate with at least one recess in the second member. Preferably, the surface of one projection provides the co-operating surface of the lock element and in the preferred embodiment this projection is the only projection which remains outwith the recess in the first member after actuation of the release device. Typically, the sides of the projection which provide the co-operating surface are at an angle of substantially 45 degrees to the direction of relative movement between the first and second members when they are withdrawn one from the other.

In the preferred embodiment the lock element comprises three projections mutually spaced in the direction of withdrawal of the first and second members and, typically, the co-operating surface is provided by the central projection.

In the preferred embodiment, the recesses are provided by circumferential grooves in the first member and the second member and the recesses are located adjacent to each other when the first member is connected to the second member. Typically, the lock element is a split ring which is located in the circumferential groove of the first member and preferably, the split ring acts as the biasing means.

BRIEF DESCRIPTION OF THE DRAWINGS

Two examples of a releasable connector will now be compared and contrasted with two prior art releasable connectors with reference to the accompanying drawings, in which:

FIGS. 1A and 1B show a first example of a prior art connector and its method of operation;

FIGS. 2A and 2B show a second example of a prior art connector and its method of operation;

FIGS. 3A and 3B show a first example of a releasable connector according to the invention and its method of operation;

FIG. 4 shows in detail a second example of a releasable connector according to the invention; and, FIG. 5 shows in more detail the connector shown in FIGS. 3A and 3B.

DESCRIPTION OF PREFERRED EMBODIMENTS

FIG. 1 shows two sections of pipe 1, 2 and a releasable connector 3 connecting the two sections of pipe 1, 2. The releasable connector 3 comprises a locking ring 4 which is located in the circumferential groove 5 in the pipe section 2 and is biased by a biasing means (not shown) to the position shown in FIG. 1A where the locking ring 4 engages a recess 6 in the pipe section 1. The releasable connector 3 also comprises a release bolt 7 which passes through the wall of the pipe section 1 so that the end 8 of the release bolt 7 co-operates with a surface 9 on the locking ring 4.

In order to release the pipe section 1 from the pipe section 2, the release bolt 7 is screwed into the pipe section 1 so that the end 8 of the release bolt 7 acts on the surface 9 of the locking member 4 to force the locking member 4 into the position shown in FIG. 1B where it is completely within the recess 5.

The problem with this type of connector is that due to manufacturing tolerances the release bolt 7 may actually enter the recess 5 in the pipe section 2. This means that when an attempt is made to disconnect the pipe sections 1, 2 the release bolt 7 is trapped by the side wall 10 of the recess 5 in the pipe section 2.

FIGS. 2A and 2B show a second example of a releasable connector 3 according to the prior art. The method of operation is similar to the method of operation of the releasable connector 3 shown in FIGS. 1A and 1B. However, in this case the release bolt 7 is screwed into the recess 6 to force the locking ring 4 into the recess 5 in the pipe section 2, and the end 8 of the release bolt 7 is forced against the side wall 11 of the pipe section 2. Hence, the release bolt 7 grips the pipe section 2 and prevents the pipe section 1 from being disconnected from the pipe section 2. As described above, both the prior art releasable connectors may inadvertently prevent pipe sections from being disconnected from each other due to manufacturing tolerances present in the connector. This can produce costly delays when large numbers of pipe sections have to be disconnected on site at an oilfield.

FIGS. 3A and 3B show a first example of a releasable connector which overcomes these problems. As with FIGS. 1A to 2B there are two sections of pipe 1, 2. Each pipe section 1, 2 has a respective circumferential groove 6, 5 and a locking ring 4 is located in the circumferential groove 5 in the pipe section 2. The locking ring 4 has two lock shoulders 12, 13, and a release crest 14 located on its external circumferential surface. The outer diameter of the surface 8 of the release crest 14 is greater than the outer diameter of the lock shoulders 12, 13.

The releasable connector 3 also comprises a release bolt 7 and the end 8 of the release bolt 7 co-operates with the outer surface 9 of the release crest 14. The release bolt 7 also has a stop ring 15 which limits the axial movement of the release bolt 7 to prevent the end 8 of the release bolt 7 entering the groove 5 in the pipe section 2 which would result in the end of the release bolt 7 becoming trapped by the side wall 10 of the groove 5 when an attempt is made to disconnect the pipe sections 1, 2.

As shown in FIG. 3B, in order to disconnect the pipe sections 1, 2 from each other the release bolt 7 is screwed into the groove 6 until it is stopped by the stop ring 15. This causes the lock ring 4 to be pushed against the action of its natural resilience into the groove 5. The location of the stop ring 15, the length of the release bolt 7 from the stop ring 15 to its end 8 and the outer diameters of the release crest 14 and lock shoulders 12, 13 are all chosen so that when the release bolt 7 is screwed into the groove 6 until it is stopped by the stop ring 15, the lock shoulders 12, 13 are completely withdrawn from the groove 6 but the release crest 14 still protrudes into the groove 6.

When this position has been achieved the pipe section 1 may be moved relative to the pipe section 2 in the direction of the arrow 50 so that the corner 16 of the pipe section 1 strikes the side 17 of the release crest 14. The sides 17, 18 of the release crest 14 are both at an angle of approximately 45° to the direction of relative movement of the pipe sections 1, 2. Hence, when the corner 16 of the pipe section 1 strikes the side 17 of the release crest 14 the lock ring 4 is forced further into the groove 5. The corner 16 slides along the surface 17 until the release crest 14 is completely withdrawn from the groove 6 at which point the pipe section 1 may be completely removed from the pipe section 2.

FIG. 4 shows an alternative example of the invention in which the release bolts 7 are actuated by a hydraulic system (not shown) which forces fluid through the passages 20 and against an end surface 21 of the release bolt 7. Except for the use of a hydraulic system to actuate the release bolt 7, this example of the invention works in a similar manner to that described above for FIGS. 3A and 3B. FIG. 4 also shows an anti-rotation pin 22 which is fixed to the pipe section 2 and co-operates with a slot 23 in the pipe section 1 to prevent rotation of the pipe section 1 relative to the pipe section 2. The anti-rotation pin 22 and an anti-rotation pin (not shown) which prevents relative rotation between the locking ring 4 and the pipe section 2 ensure that the release bolt 7 is always correctly aligned with the release crest 14 of the lock ring 4.

The pipe section 2 also has two O-rings 24, 25 located in it and these prevent fluid flowing within the pipes from escaping through the joint where the two pipe sections 1, 2 are connected. The O-rings 24, 25 also prevent leakage of a fluid within pipes, from the pipes at the point of connection.

FIG. 5 is similar to FIG. 4 but shows the use of the releasable connector shown in FIGS. 3A and 3B in place of the hydraulic connector shown in FIG. 4.

The use of a releasable connector as shown in FIGS. 3A and 3B, 4 and 5 mitigates the problems of the prior art apparatus by helping to prevent the release bolt 7 from being inserted too far and by enabling relative movement of the two pipe sections to be achieved while the release crest 14 of the lock ring 4 is still within the groove 6 in the pipe section 1.

Modifications and improvements may be incorporated without departing from the scope of the invention.

I claim:

1. A releasable connector for connecting a first member to a second member, said members being adapted to be inserted one within the other, comprising a lock element located in a recess in a surface of said first member; biasing means to bias said lock element to a first position in which said lock element extends from said recess to engage a shoulder on said second member to lock said first member to said second member against withdrawal; and a movable release device located on said second member whereby actuation of said release device causes a surface of said release device to co-operate with a surface of said lock element to move said lock element to a second position, against the action of said biasing means, in which said lock element is disengaged from said shoulder on said second member with the cooperating surface of said release device terminating spaced from said recess in said first member, the lock element being configured such that during withdrawal of said members one from the other said lock element is moved to a third position in which said lock element is further into said recess than in said second position.

2. A releasable connector according to claim 1, wherein said release device comprises a bolt and is actuated by screwing said bolt through said second member so that an end of said bolt co-operates with said surface of said lock element.

3. A releasable connector according to claim 1, wherein said release device comprises a fluid actuated piston within said second member which upon actuation by the fluid is forced to co-operate with said surface of said lock element.

4. A releasable connector according to claim 1, wherein said release device comprises a stop element which prevents said release device from entering said recess in said first member.

5. A releasable connector according to claim 1, wherein said lock element comprises a number of projections which co-operate with at least one recess in said second member.

6. A releasable connector according to claim 5, wherein said surface of one projection provides said co-operating surface of said lock element.

7. A releasable connector according to claim 6, wherein said one projection is the only projection which remains outside said recess in said first member when said lock element is in said second position.

8. A releasable connector according to claim 5, wherein said lock element comprises three projections mutually spaced in the direction of withdrawal of said first and second members.

9. A releasable connector according to claim 5, wherein said recesses are provided by circumferential grooves in said first member and said second member and said recesses are located adjacent to each other when said first member is connected to said second member.

* * * * *